United States Patent
Lue et al.

(10) Patent No.: US 9,019,837 B2
(45) Date of Patent: Apr. 28, 2015

(54) PACKET MODIFICATION TO FACILITATE USE OF NETWORK TAGS

(71) Applicant: Cisco Technology, Inc., San Jose, CA (US)

(72) Inventors: Allan Lue, Saratoga, CA (US); Darrin Miller, Marysville, OH (US)

(73) Assignee: Cisco Technology, Inc., San Jose, CA (US)

( * ) Notice: Subject to any disclaimer, the term of this patent is extended or adjusted under 35 U.S.C. 154(b) by 123 days.

(21) Appl. No.: 13/770,062

(22) Filed: Feb. 19, 2013

(65) Prior Publication Data

US 2014/0233564 A1   Aug. 21, 2014

(51) Int. Cl.
| | |
|---|---|
| H04L 29/06 | (2006.01) |
| H04W 28/24 | (2009.01) |
| H04W 80/04 | (2009.01) |
| H04W 8/04 | (2009.01) |
| H04L 12/707 | (2013.01) |
| H04L 12/46 | (2006.01) |
| H04L 12/723 | (2013.01) |

(52) U.S. Cl.
CPC ............... *H04L 63/20* (2013.01); *H04L 45/22* (2013.01); *H04L 12/4645* (2013.01); *H04L 63/0272* (2013.01); *H04L 63/164* (2013.01); *H04W 28/24* (2013.01); *H04W 80/04* (2013.01); *H04W 8/04* (2013.01); *H04L 45/50* (2013.01)

(58) Field of Classification Search
CPC . H04L 63/20; H04L 12/4645; H04L 63/0272; H04L 63/164; H04W 28/24; H04W 80/04; H04W 8/04

USPC ................ 370/254–350; 709/201–213
See application file for complete search history.

(56) References Cited

U.S. PATENT DOCUMENTS

| | | | |
|---|---|---|---|
| 7,530,112 B2 | 5/2009 | Smith | |
| 7,954,163 B2 | 5/2011 | Smith | |
| 2006/0090208 A1* | 4/2006 | Smith | 726/26 |
| 2006/0112426 A1* | 5/2006 | Smith et al. | 726/13 |
| 2006/0112431 A1* | 5/2006 | Finn et al. | 726/22 |

* cited by examiner

*Primary Examiner* — Phirin Sam
*Assistant Examiner* — Debebe Asefa
(74) *Attorney, Agent, or Firm* — Edell, Shapiro & Finnan, LLC

(57) ABSTRACT

A technique for accommodating network tagging technology includes receiving a packet that includes a network tag at a modifying node capable of modifying the packet in relation to the network tag; determining whether the packet is to be forwarded to a non-recognizing node in a network, the non-recognizing node not being capable of processing packets with network tags at a desired speed or at all; and in response to determining that the packet is to be forwarded to the non-recognizing node, modifying the packet to obtain a modified packet and sending the modified packet to the non-recognizing node, wherein the modified packet is capable of being processed by the non-recognizing node at the desired speed. After being processed by the non-recognizing node, the modified packet is received by a restoring node, where the cached information is used to restore the network tag of the packet.

14 Claims, 8 Drawing Sheets

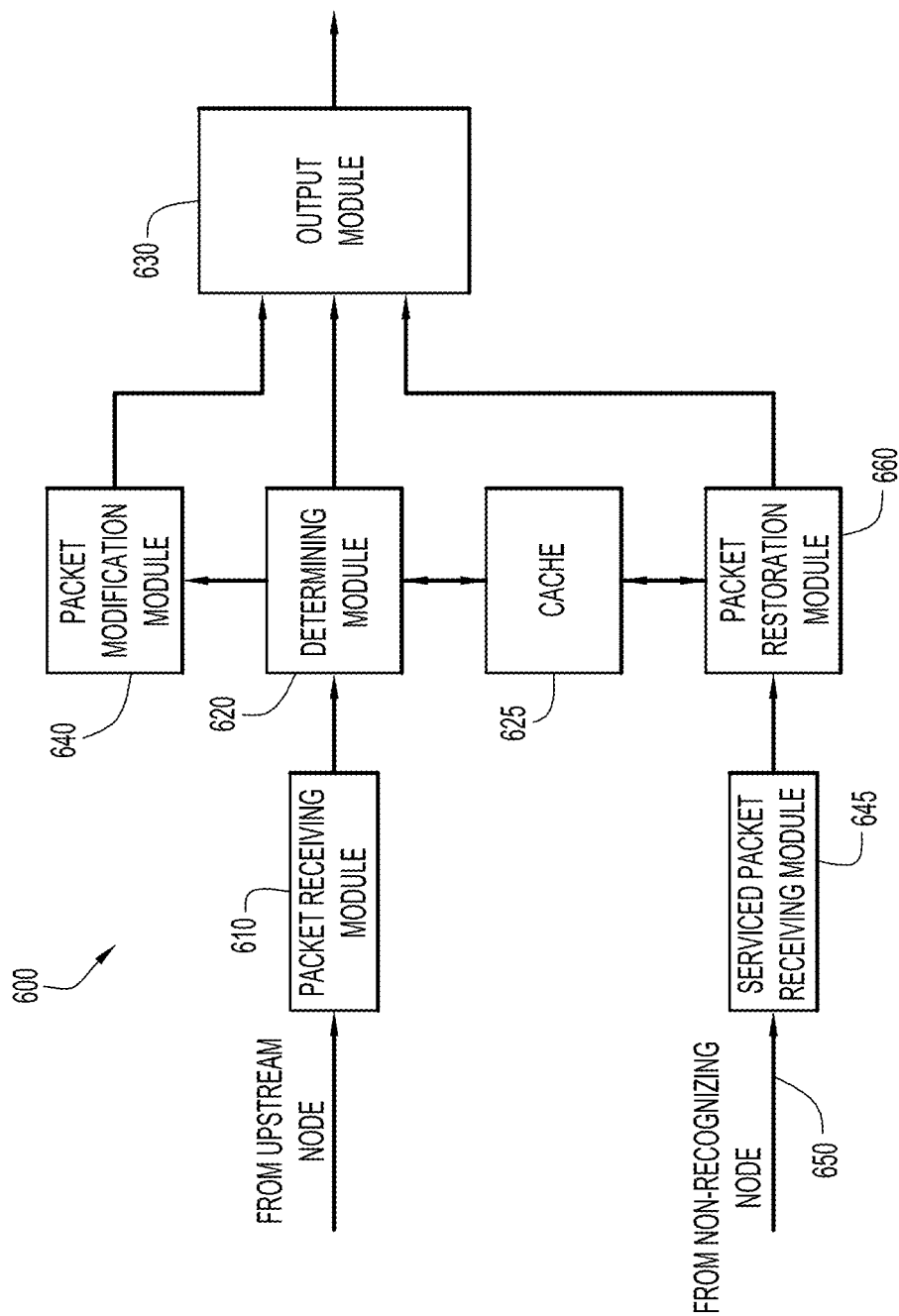

PACKET MODIFICATION TO FACILITATE USE OF NETWORK TAGS

TECHNICAL FIELD

The present disclosure relates generally to processing packets with network packet tags.

BACKGROUND

Packetized data networks typically format data into packets for transmission from one site to another. In particular, the data is partitioned into separate packets at a transmission site, wherein the packets usually include headers containing information relating to packet data and routing. The packets are transmitted to a destination site in accordance with one or more data transmission protocols, where the transmitted data is recoverable from the received packets. Tags can be inserted into packets for a variety of purposes. For example, tags can be used for forwarding classification of packets, such as utilized in Multiprotocol Label Switching (MPLS), in which packet-forwarding decisions are made based solely on the contents of a packet label without having to examine the packet itself. This allows the ability to create end-to-end circuits across different types of transport media, using any protocol.

Tags also can be used for traffic segmentation, such as the use of IEEE Standard 802.1q protocol Virtual Local Area Network (VLAN) tags. For example, a VLAN tag signifying VLAN 4 or VLAN 322 indicates a particular VLAN route for the packet. Additionally, tags can be used for network service orchestration, such as the Cisco Service Insertion Architecture (SIA) tag for service insertion and chaining, or network security, such as the Cisco Security Group Tag (SGT).

These tagging technologies generally require that all network devices between the tag encapsulation and the tag decapsulation nodes of the packet path must be able to process and/or preserve network tags. To take advantage of a particular network tag technology, it may be necessary to upgrade all network devices across at least some portion of a network. The substantial cost associated with such a network upgrade may discourage early adoption of the network tag technology and deprive subscribers of its benefits.

BRIEF DESCRIPTION OF THE DRAWINGS

FIG. 6 is a block diagram illustrating an apparatus for analyzing a packet to determine an appropriate modification to be performed on the packet, in accordance with the techniques presented herein.

DESCRIPTION OF EXAMPLE EMBODIMENTS

Overview

Figure 1:
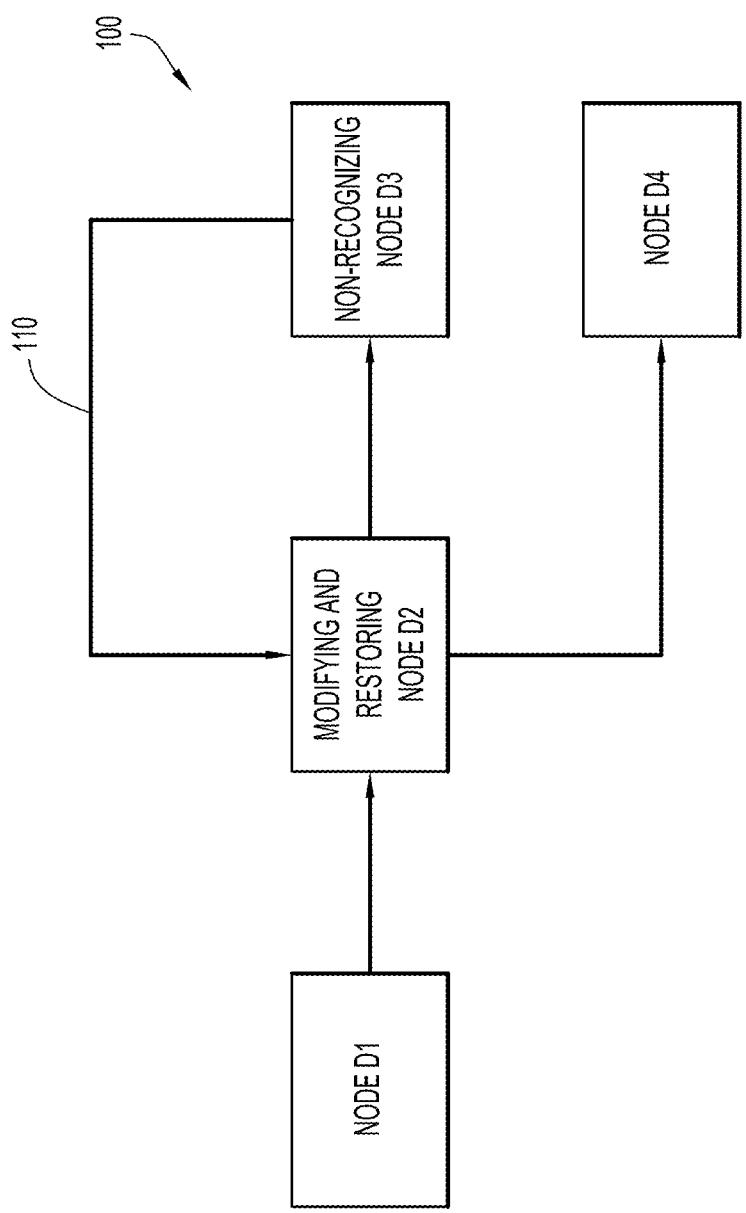
FIG. 1 is a network diagram showing a "one arm model" of a network service deployment of nodes to which the techniques presented herein are applicable.

Presented herein are techniques to accommodate network tagging technology in networks that may include devices that are not compatible with the network tagging technology and/or that cannot process packets with network tags at a desired operating speed of those devices.

One technique for accommodating network tagging technology includes receiving a packet that includes a network tag at a modifying node capable of modifying the packet in relation to the network tag; determining by the modifying node whether the packet is to be forwarded to a non-recognizing node in the network, the non-recognizing node not being capable of processing packets with network tags at a desired speed or at all; and, in response to determining that the packet is to be forwarded to the non-recognizing node, modifying the packet to obtain a modified packet and sending the modified packet to the non-recognizing node, wherein the modified packet is capable of being processed by the non-recognizing node at the desired speed. The packet can be modified by temporarily removing or "stripping" the network tag or by temporarily replacing the original network tag with a replacement tag or indicator known to the non-recognizing node (i.e., "translating"). In the case of tag stripping or translating, the modifying node maintains a network tag cache table that maps the network tags to the packet source addresses and/or the replacement tags to facilitate rapid packet modification. Once the modified packet has been processed by the non-recognizing node, the network tag cache table is used at a restoring node to restore the modified packet, either by re-inserting the original network tag (in the case of stripping) or by replacing the replacement tag with the original network tag (in the case of translating). The restoring node can be the modifying node or a node downstream of the non-recognizing node, in which case the modifying node forwards the tag cache information to the restoring node. According to another approach, the modifying node modifies the packet by encapsulating the packet with a header containing a downstream destination address of the restoring node, which can process the network tag. The encapsulating header causes the non-recognizing node to send the modified packet downstream toward the destination (restoring) node without evaluating the network tag within the packet.

Example Embodiments

According to one or more techniques to be described in detail below, a network tag accommodation scheme is provided to allow new tagging technologies to coexist with legacy or non-compatible network devices and to enable a network device (also referred to herein as a "node") to operate at a desired speed of that network device while handling packets containing network tags that are not supported by the network device.

In a computer network, data is transmitted from a source to a destination in the form of packets that generally pass through one or more network devices (e.g., switches, routers, firewalls, etc.). During the transmission, the network devices may perform one or more operations on the packets. For example, a network device may perform a service, such as a firewall function or a server load balancing function. The network device that performs this service may not be able to process packets with network tags at a desired speed (e.g., at a multi-gigabits per second (Gbps)), such as the speed at which network routers and network switches can process packets with network tags within the network. By way of example, a firewall node may be able to operate at a 10 Gbps line speed on packets without network tags, but the firewall node drops down to a 5 Gbps rate when it processes packets with network tags due to the extra processing time that results due to having to parse the information in the network tag of a packet. For some network devices, it is not a matter of operating at a lower capacity, but rather simply dropping packets that contain tags not recognized by the devices. When tagged packets are dropped in this manner, the service provided by the packets is not applied, and the upper layer applications viewing the network connections will assume they are timed out or broken.

The use of a network tag accommodation scheme according to one or more techniques described herein allows devices that cannot process network-tagged packets at a desired speed or at all (also referred to herein as "non-recognizing node(s)") to nevertheless handle such packets at the desired speed (i.e., at a speed that is greater than the speed at which the device could process the network-tagged packets) by modifying packets prior to being sent to the non-recognizing devices. As described in greater detail below, the packet modification may involve temporarily stripping network tags from packets, translating each network tag into another type of tag or indicator recognizable to devices that cannot recognize the original network tag, or encapsulating packets to avoid processing of the network tags by such network devices. This modification produces modified packets that a service device can understand and process to create a working network for upper layer applications that would otherwise not be possible. The modified packets are restored to their original structure after having been processed by such network devices (e.g., by re-inserting the network tags, translating back to the original tags, or decapsulating the packets). In this manner, it may not be necessary to immediately upgrade or replace network devices that cannot process a new tagging scheme efficiently (or at all). For example, if only a portion of a network is upgraded to a new network tag technology, other portions of the network that are not upgraded to the new network tag technology can interface with the upgraded portions of the network without causing the devices in those non-upgraded portions of the network to operate at less than their maximum capable packet processing speed or to drop the network-tagged packets, by utilizing the packet modification and accommodation schemes described below.

The types of network tags that can be accommodated include, but are not limited to, SIA tags, SGT tags, VLAN tags, MPLS tags, IEEE Standard 802.1q tags, etc. Such network tags typically are provided in predetermined locations within a packet header, but may alternatively be provided in other predetermined portions of a packet (e.g., at the beginning or end of a packet's payload). Also, other types of packet classification mechanisms besides network tags may be envisioned for use with the packet modification and accommodation techniques. For example, sideband information that is separate from a packet but that is sent concurrently with a packet along a network path may be utilized in the techniques described below, in a similar manner as a network tag embedded in the packet. This technique can be used to populate the databases that are shared across these sideband protocols like SXP (Cisco SGT Transport Protocol). Administrators need to extract the IP-tag from the tagged cloud for use with either these sideband protocols and/or applications like Netflow collectors. In addition, if a network device is unto itself a services node (QOS, WAAS, etc.) and needs access to each flow's new network tag (e.g., SGT) for service classification, then tag caching is the only way to gain access to this information at the midpoint of the network.

A modifying network node modifies received packets containing network tags prior to sending the packets to a non-recognizing network node that cannot process such packets at a desired speed or at all. The packet modification may involve one of the following: a) stripping network tags from packets prior to those packets being sent to a non-recognizing network node (e.g., a service node that does not support the network tags or a non-service node that is not capable of processing packets at a desired speed or at all); b) translating the network tags in packets to a different type of network tag or indicator that the non-recognizing network node can process at a desired speed; or c) encapsulating the packets prior to sending the packets to the non-recognizing network node such that the non-recognizing network node is capable of handling such encapsulated packets at a desired speed. The stripping and translating implementations are supported by a tag caching scheme described herein involving storing information in a cache table that allows modified packets to be restored to their original form, either at the node that modified the packets or at a downstream node. The packets received from the non-recognizing network node are retagged with their original network tags based on the cached information. In the case of encapsulation, when the packets arrive at a destination node specified in an encapsulating header, the packets are decapsulated and thereby restored to their original form.

FIG. 1 shows a one arm model of a service deployment structure in a network 100 in which a network node, such as a firewall or a server load balancer, receives modified packets for servicing. In FIG. 1, packets are output from upstream node D1 to node D2, which can be, for example, switches and/or routers. Node D2 provides packets to node D3, which performs some type of processing on packets that it receives. Node D3 returns processed packets to node D2 via return path 110, and node D2 then sends packets to downstream node D4 that have been processed by node D3. In this example, network nodes D1, D2, and D4 are capable of recognizing and processing network tags of interest, whereas node D3 is a "non-recognizing" node.

As described above, non-recognizing node D3 is not capable of processing packets with network tags at a desired packet processing speed or at all (i.e., the network tags either encumber processing at node D3 resulting in a reduced processing speed or else prevent processing of the packets altogether). This could be because node D3 may be manufactured by a vendor that is different from the vendor that manufactured the switches and router nodes D1 and D2, where the manufacturer of node D3 may be lagging behind the network tagging technology used by the other nodes in the network. By way of example, when node D3 receives a packet with a network tag, node D3 may attempt to retrieve the network tag and to process the information within the network tag, thereby increasing the time it takes node D3 to process the packet. Without a network tag in a received packet, node D3 will not waste any time attempting to extract and process a network tag.

Service nodes provide important functions to a network, such as a firewall function, a load balancing function, or intrusion prevention, and so they have to be accommodated in the network. One way to deploy the tagging scheme while still accommodating service nodes is to move the service somewhere outside of the network tagging domain of the network, and another way to accommodate such nodes is to not deploy a new tagging technology that those nodes do not support.

The first way is not a viable option because network designs typically mandate certain topologies; thus, moving a service node outside of a network may not be permitted. Consequently, the second option typically becomes the choice used by network administrators, which is unfortunate because it causes networks not to use the most current network technologies, which typically result in faster network speeds and better network operability. The techniques described herein allow service nodes that are incompatible or not fully compatible with a new tagging technology to nevertheless be maintained within a network tagging domain that employs the new tagging technology.

With reference back to FIG. 1, which shows a configuration in which node D3 may be a service node, for each tagged packet that it receives and that is destined for node D3, node D2 operates as a "modifying" node capable of modifying network-tagged packets with respect to their network tags, and caches the source address (e.g., the Internet Protocol (IP) source address) and the network tag as an information pair (or "tuple"). Node D2 then modifies the tagged packet (e.g., by stripping the network tag or translating the network tag), and sends the modified packet to non-recognizing node D3. Node D3 then processes the packet in a particular manner, such as by providing network firewall processing to the packet and/or performing a load balancing processing to the packet. After the processing of the packet by node D3 has been completed, node D3 sends a processed packet back to node D2. In the topology shown in FIG. 1, node D2 also serves as the "restoring" node for restoring the modified packet such that the network tag is available to the restoring node and downstream nodes. Node D2 restores the packet's network tag to its original form and then forwards the processed packet to its eventual destination. In FIG. 1, node D2 forwards the processed packet to downstream node D4, which may be the destination node, or it may be a router or switch that is provided to route the packet to its eventual destination node.

Node D2 accomplishes restoration of the tag portion of the packet, e.g., by reattaching the network tag that it has stripped off the packet prior to sending the packet to node D3 or by translating the network tag back to its original form. Node D2 does this by comparing the IP source address or the replacement tag of each packet that it receives from node D3 to the cached "tuples" or pairings of network tag information with IP source addresses and/or replacement tags stored by node D2. When there is a match of an IP source address or a replacement tag of a packet received from node D3 with a corresponding IP source address or replacement tag of a cached tuple stored in the network tag cache table at node D2, that node attaches the network tag associated with the IP source address in the cache to the packet, and sends the network tagged packet to downstream node D4.

Figure 2:
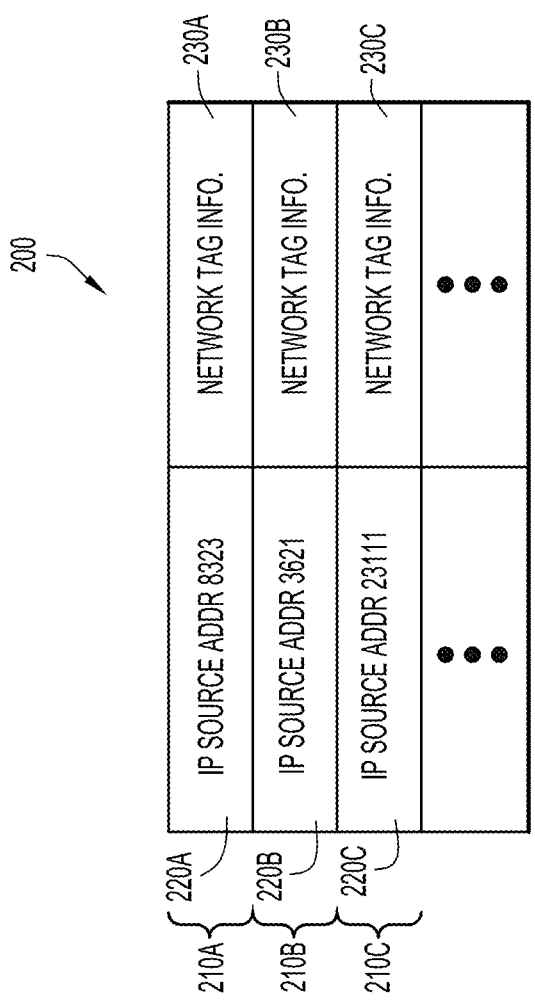
FIG. 2 is a block diagram showing one possible implementation of a cache that can be used in accordance with the techniques presented herein.

FIG. 2 shows one possible implementation of a network tag cache 200 that can be generated by a modifying node and used by a restoring node, such as node D2 in FIG. 1, for restoring network tags in packets that were modified by node D2 prior to sending to a non-recognizing node that is either not capable of processing tagged packets at all or that cannot process tagged packets at a desired speed. The cache implementation shown in FIG. 2 can be used, for example, in a scheme in which stripping of tags is used to modify network-tagged packets. The cache implementation shown in FIG. 3 below is suitable for schemes in which packets are modified by translating network tags. As described in greater detail below, cache management schemes can be employed to perform housekeeping on cache 200. For example, IP source address/network tag pairs or tuples that have not been used for more than a predetermined period of time can be removed from cache 200 to keep the cache storage requirements within acceptable limits.

Cache 200 includes entries 210A, 210B, 210C, . . . , in which each entry corresponds to an IP source address 220A, 220B, 220C, . . . , and network tag information 230A, 230B, 230C, . . . . For each packet that modifying node D2 receives from an upstream node, such as node D1, and for which that packet is to be processed by node D3, node D2 records the IP source address and the network tag information as a separate entry (e.g., a separate row) in cache 200. Then, node D2 modifies the packet (e.g., by stripping the network tag) and sends the modified packet to node D3 for processing. Node D3 processes the modified packet and returns a processed packet to node D2. Node D2, which in this example is also the restoring node, then checks the IP source address of the processed packet that it received from node D3 with the information in the cache 200, and restores the packet with the appropriate network tag information associated with the IP source address of the packet that it received from node D3, using the corresponding network tag information stored in cache 200.

Figure 3:
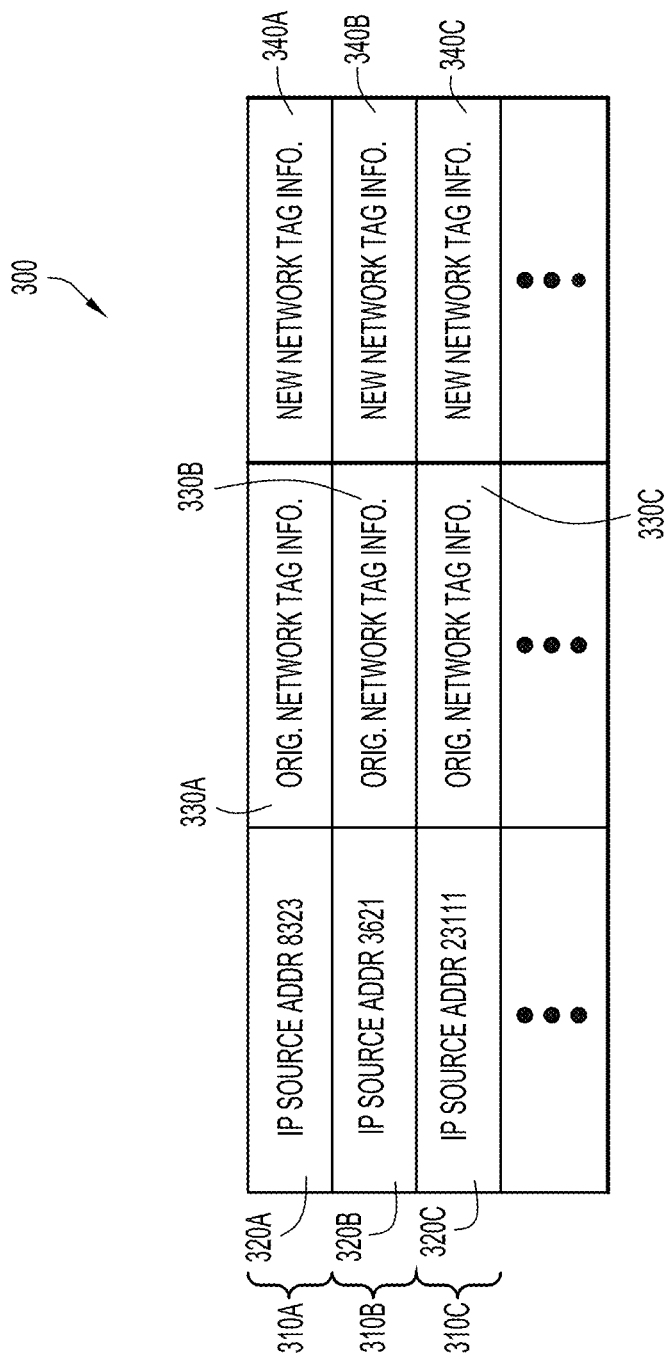
FIG. 3 is a block diagram showing another possible implementation of a cache that can be used in accordance with the techniques presented herein.

FIG. 3 shows an example of a caching scheme for handling network-tagged packets in a network involving translating network tags. In FIG. 3, a cache 300 includes entries 310A, 310B, 320C, . . . , in which each entry corresponds to an IP source address 320A, 320B, 320C, . . . , first network tag information 330A, 330B, 330C, . . . , and second network tag information 340A, 340B, 340C, . . . . In this instance, referring back to FIG. 1, node D3 can process only packets with a particular network tag, such as an IEEE Standard 802.1q standard network tag. As such, whenever a packet is received by node D2 for routing to non-recognizing node D3, and the packet does not have an IEEE Standard 802.1q network tag, then modifying node D2 removes the existing network tag from the packet and rewrites it with a corresponding IEEE Standard 802.1q network tag (i.e., translating the network tag). As suggested by FIG. 3, this translation may maintain a one-to-one mapping between the original network tag (e.g., not decipherable by node D3) and the new replacement network tag that is recognizable to non-recognizing node D3. This approach helps simply both the forward (modify) and backward (restore) translation. For example, a packet with a SIA or SGT network tag is rewritten by modifying node D2 with an IEEE Standard 802.1q network tag, and then sent to node D3 for processing. When node D3 is finished processing the packet, it sends the processed packet to node D2, which then compares the IP source address of the processed packet that it received from node D3 with the information in the cache 300, and rewrites the network tag in the packet with its original network tag (e.g., the SIA or SGT network tag). In FIG. 3, the first network tag information 330A, 330B, 330C, . . . , may correspond to SIA or SGT network tag information, and the second network tag information 340A, 340B, 340C, . . . , may correspond to IEEE Standard 802.1q network tag information, for example. In some implementations, the second network tag information is created to be as close as possible in information content to the first network tag information (e.g., if those two network tags have similar fields, then those fields of the second network tag are provided with the same information as in those fields of the first network tag).

The network tag cache structure shown in FIG. 3 represents just one possible cache implementation in the case of tag translation. According to another approach, the network tag cache can comprise a translation table including pairing (tuples) of original tags and new, replacement tags (e.g., a cache table with the middle and right columns shown in FIG. 3 but without the IP source address column). With this caching mechanism, a cache entry (e.g., [original tag, new tag]) can be created at the arrival of the first packet with the original tag at the modifying node, essentially allocating the "new tag" to be associated with the "original tag." With cache lookup, described in greater detail below, subsequent packets with the original tag can be modified to use the new tag without going through the entire caching scheme. The tag restoration operation or looking up [original tag, new tag] can be viewed as utilizing a caching scheme to simplify/expedite tag application/insertion, since selecting and applying a tag from scratch is usually much more complicated. While inclusion of the IP source address in each cache entry is not strictly necessary in the translation implementation (e.g., [IP Src, original tag, new tag]), it may be more efficient in certain implementations to lookup the IP source address and apply either the new replacement tag (in the translating operation) or the original tag (in the restore operation).

Figure 4:
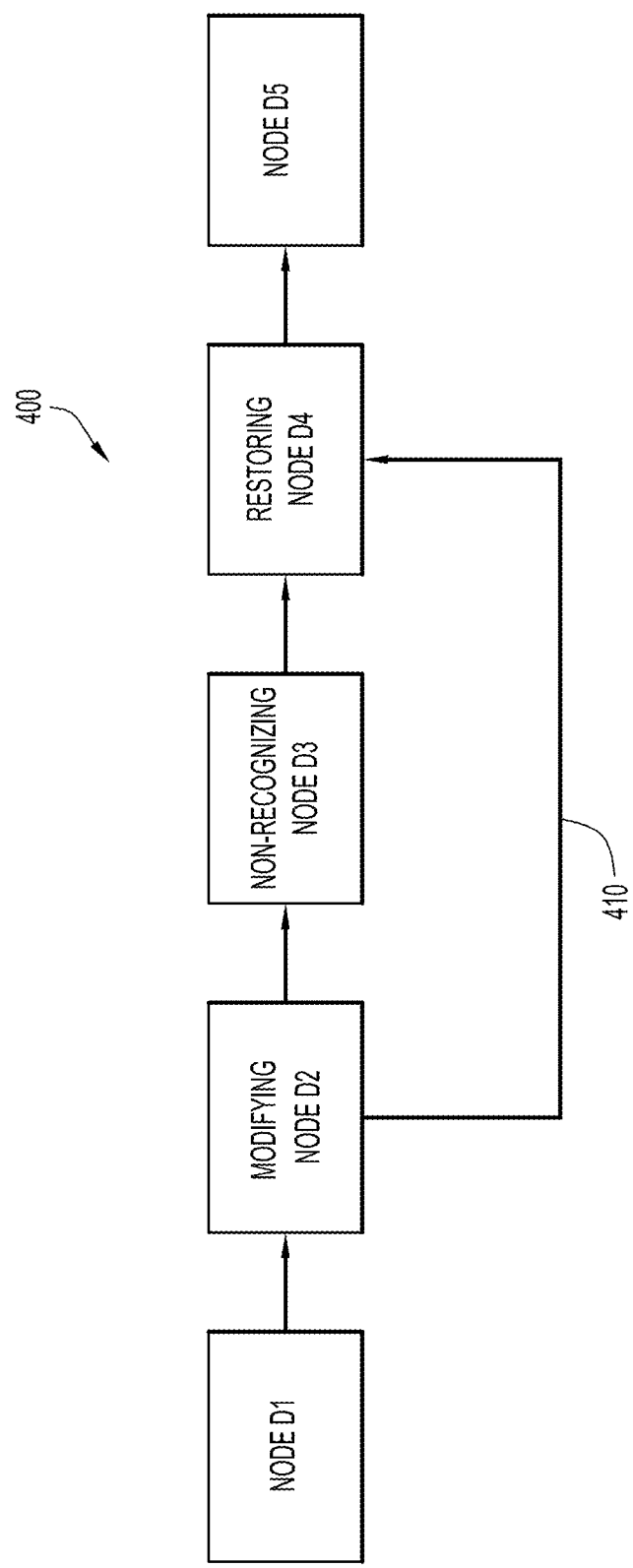
FIG. 4 is a network diagram showing a series connection of nodes to which the techniques presented herein are applicable.

FIG. 4 shows a different network configuration 400 for which network tag accommodation techniques can be utilized, in which a data packet path through nodes D1, D2, D3, D4 and D5 is a series-connected data path. In this example, nodes D1, D2, D4, and D5 are compatible with and capable of recognizing and processing the network tags of interest, whereas node D3 is a non-recognizing node that cannot recognize and/or process the network tags at a desired speed or at all. Initially, node D1 sends packets to modifying node D2. Nodes D1 and D2 can be, for example, network switches or routers. Node D2 sends packets to node D3 for node D3 to perform some type of operation on the packets or simply to route the packets to the next downstream node. In some implementations, node D3 acts as a transparent network node between network nodes D2 and D4. Node D3 may be a distribution switch in a data center or a Local Area Network (LAN) acceleration module, for example. Alternatively, node D3 may be a router or switch that has not been upgraded to handle the latest network tag technology that nodes D1, D2, D4 and D5 can handle, or is made by a different manufacturer that requires a different packet structure for processing, or that cannot handle the processing of network-tagged packets at a desired speed for some other reason.

Node D2 can use a tag caching function in a similar manner as described above, in which packets destined for non-recognizing node D3 from node D2 are modified in some manner, such as by stripping off a network tag from a packet or by changing the network tag from one type to another type (translating) and then sending the modified packet to node D3 for processing. Node D2 also sends the network tag cache information to a downstream restoring node D4. That information may be sent via a control protocol connection 410 as shown in FIG. 4, which is a path or channel provided between node D2 and node D4. This path or channel may be a dedicated path or channel between node D2 and D4, or it may be shared path or channel in which the information provided on that path or channel is such that the recipient of that information (e.g., node D4) is able to determine the device (e.g., node D2) that output that information onto the shared path or channel. That information may include the IP source address of packets that were modified by node D2, and the manner in which those packets were modified (e.g., the original network tag associated with those packets). In short, the contents of the cache table developed at node D2 (the packet modifying node) are sent to the node D4 (the packet restoring node) so that node D4 can reapply the network tag. When node D4 receives processed packets from node D3, it compares the IP source address or the replacement tags of those packets with the information provided to it from node D2 on control protocol connection 410, and if there is a match, node D4 restores the packets' network tags to their original form as described above by re-inserting the original network tag. Similar to the other techniques described earlier, node D4 may maintain a cache for storing the modified packet data information that is provided to it from upstream modifying node D2.

For example, if node D2 had stripped a network tag from a packet prior to sending that packet to node D3, when node D4 receives a packet output from node D3 that has the same IP source address as provided to node D4 via the control protocol connection 410, node D4 then reattaches an appropriate network tag to the packet prior to sending the packet to a downstream node D5.

If node D2 had modified the network tag from a packet from a SIA or SGT network tag to an IEEE Standard 802.1q network tag prior to sending that packet to node D3, when node D4 receives a packet output from node D3 that has the same IP source address as provided to node D4 via the control protocol connection 510, node D4 then changes the network tag back to a SIA or SGT network tag prior to sending the packet to the downstream node D5. In particular, node D4 looks up the cache based on the 802.1q tag (e.g., vlan 301) to retrieve its corresponding network tag based on the one-to-one correspondence specified by the mapping of the cache table.

For the sake of simplicity, FIG. 4 illustrates only one non-recognizing node (node D3) between modifying node D2 and restoring node D4. It will be appreciated that more than one non-recognizing node may lie in the network path traversed by packets between the modifying node and the restoring node, and the described techniques are not limited to topologies with any particular number of non-recognizing nodes.

In the network topology shown in FIG. 4, packet encapsulation is yet another packet modification technique that can be employed to enable network-tagged packets to be handled by legacy or other nodes that do not recognize the network tags. According to this technique, when a packet is to be routed through a node that does not recognize the network tag, the packet is encapsulated with a header that establishes a tunnel and specifies a destination address indicating a tunnel end point. For example, network-tagged packets can be encapsulated with a Generic Routing Encapsulation (GRE) of a GRE tunneling protocol. Since the encapsulating GRE header can be the same for all packets being encapsulated (i.e., indicating the same tunnel destination address), a network tag cache table is not required in this case.

Referring to FIG. 4, in the case of encapsulation/decapsulation, when modifying node D2 receives a network-tagged packet destined for non-recognizing node D3, which does not recognize or cannot process the network tag but can process GRE-encapsulated packets, node D2 encapsulates the packet with a GRE header containing an outer IP destination address corresponding to downstream restoring node D4 (which is capable of processing the network tag). For example, a packet with a SIA or SGT network tag is encapsulated by node D2 with a GRE header, and then routed node D3. Node D3 recognizes the GRE header and forwards the modified packet downstream based on the IP destination address in the GRE header without further parsing or processing the packet. In this manner, the network-tagged packet passes through node D3 without the node attempting to evaluate or process the network tag, thereby avoiding any problems with node D3 handling the packet.

GRE tunnel decapsulation is based on the outer destination IP address of the packet. When restoring node D4 receives a GRE-encapsulated packet, node D4 evaluates the outer IP destination address contained in the GRE header. If the outer IP destination address the tunnel end point address corresponds to node D4, node D4 decapsulates the packet by removing the GRE header from the packet. The decapsulated packet can then be forwarded by node D4 to downstream node D5 in its original form (with its original network tag, such as a SIA or SGT network tag).

In an alternative configuration from what is shown in FIG. 4, in a case where node D3 has more than one output (or branch) path, to nodes D4A, D4B, D4C, for example, each of those nodes D4A, D4B, D4C would have a separate control protocol connection with the upstream node D2. Those separate control protocol connections provide information to nodes D4A, D4B, D4C to allow those nodes to add a network tag back to a packet that node D2 had stripped from the packet prior to node D2 sending the packet to node D3 for processing, to change a network tag back to its original network tag based on what node D2 had done to the packet prior to node D2 sending that packet to node D3 for processing, or to decapsulate a packet that was encapsulated by node D2 prior to node D2 sending that packet to node D3 for processing.

The cache at modifying node D2 may be of a sufficient size to handle many different IP source addresses and associated network tags. Additionally, aging techniques may be applied to the cache in order to remove entries from the cache that have not resulted in hits for at least a particular amount of time (e.g., one hour, one day, etc.), to allow newer IP source addresses to be written into the cache in a cache build process and to maintain information within the cache for the most likely packets that are to be modified by node D2 prior to sending those packets to service node D3.

The procedure by which node D2 compares packet information of packets provided to it from upstream node D1 may be an Application Specific Integrated Circuit (ASIC)-based procedure, in which a flow mask can be used to compare the IP source address and network tag of received packets with IP source addresses stored in the cache at node D2, and if there is a hit, to modify the packet accordingly. When there is no hit (e.g., a miss) in the cache, the procedure may then utilize software (e.g., a processor or CPU) to learn the information in the "missed" packet to thereby update the cache with the IP source address and network tag of the "missed" packet.

In some instances, all packets output from node D2 are destined for node D3 for processing, and so all packets are processed by node D2 in a particular manner prior to sending those packets to node D3. In other instances, only some packets output from node D2 are destined for node D3 for processing, and so only those packets are processed by node D2 in a particular manner prior to sending those packets to node D3. Other packets that are not destined for node D3 are not modified by node D2; rather, node D2 obtains information from packets provided to it from upstream node D1 to determine whether those packets are to go to node D3 or not, before it performs any packet modification procedures. For example, based on the IP source address of a packet received by node D2, that packet may be either sent to node D3 or not. Or, based on some other field in the packet header, that packet may be either sent to node D3 or not.

The technique in which the packet is encapsulated in some manner by node D2 prior to sending to node D3, such as by encapsulating a packet with a GRE header, may be more useful than changing the network tag of a packet prior to sending the packet to node D3 in cases where node D3 is a common network switch or router that is not capable of processing a network tag at all. For example, if node D3 is a service node, such service nodes generally need to parse past the network tag to obtain deeper information within the packet. That is, when a packet is received by node D3 in which the packet is encapsulated, depending upon the type of device corresponding to node D3, the network tag within the encapsulated packet is not retrieved, but rather only the information in the encapsulated part of the packet (e.g., the GRE information) is retrieved and analyzed to determine how to process the packet. However, when node D3 is a firewall, which typically has to drill down to the core of the packet to process all of the information in the packet (e.g., to check for a virus in the packet), an encapsulation scheme would not be especially useful, since the firewall would eventually have to process the encapsulated network tag that was not modified by node D2, thereby causing the firewall to operate at less than a desired speed on such encapsulated packets. However, a network tag stripping scheme or a network tag changing scheme (assuming that the firewall operates well on packets having a particular type of network tag) would allow the firewall to operate at its optimal speed.

The network structure shown in FIG. 1 corresponds to a structure in which node D3 is typically a service node, in which the network structure shown in FIG. 4 corresponds to a configuration in which node D3 need not be a service node (e.g., node D3 can be a switch or router that merely routes the packet onto a particular network path, in which that node is not upgraded to handle certain types of network tags that may be provided within packets). With the FIG. 4 configuration, the use of encapsulation when node D3 is a non-service node (e.g., node D3 does not have to analyze information within the network tag of the packet) is a useful scheme, along with either the network tag stripping scheme or the network tag translation scheme described above. With the FIG. 1 configuration, the use of encapsulation when node D3 is a service node (which is typically the case with this type of configuration) may not be particularly useful, since node D3 would typically have to decapsulate the packet to retrieve all of the information within the packet prior to performing the service on the packet, which would cause node D3 to attempt to retrieve the network tag that it cannot process at all or cannot process at a desired speed.

The techniques described above are compatible with control protocols (e.g., SXP) that allow tagging packets without a hardware upgrade, in which the control protocol may be used to provide the control path (see path 410 in FIG. 4) to send information from one node to another node in a network. The control protocol need not provide for cache building and cache learning itself. The control protocol primarily provides a carrier mechanism for sending packets containing the network tag cache information from one node to another node in a network.

Figure 5A:
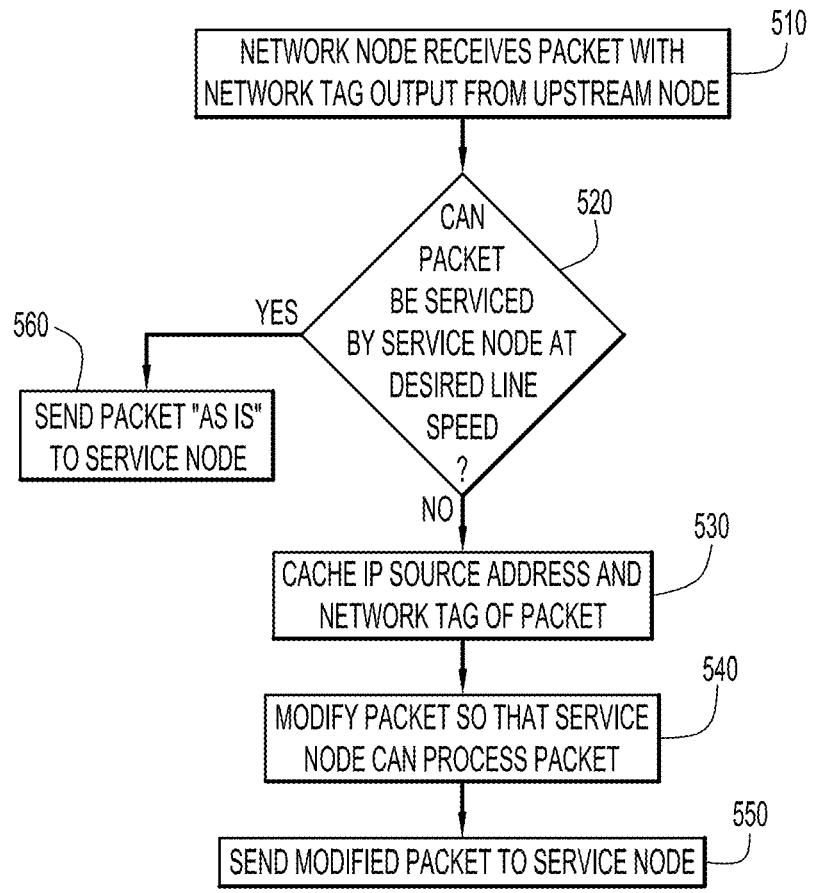
FIG. 5A is a flow diagram illustrating a method of analyzing a packet to determine an appropriate modification to be performed on the packet, in accordance with the techniques presented herein.

FIG. 5A is a flow diagram of a method of caching packets and modifying packets prior to sending those packets to a service node. In step 510, a first, modifying node in a network receives a packet output from an upstream node in the network, in which the packet includes a network tag. In step 520, the first node determines whether the packet is to be forwarded to another node in the network that is not capable of processing packets with network tags at a desired speed or at all. If the determination is that the other node is a non-recognizing node not capable of processing packets with network tags at a desired speed ("No" path output from step 520), then in step 530 an Internet Protocol (IP) source address and a network tag associated with the packet are cached, in step 540 the packet is modified to obtain a modified packet, and in step 550 the modified packet is sent to the non-recognizing network node for servicing. If the determination is that the other node is capable of processing packets with network tags at a desired speed ("Yes" path output from step 520), then in step 560 the packet is sent to the other node without being modified by the first device.

Figure 5B:
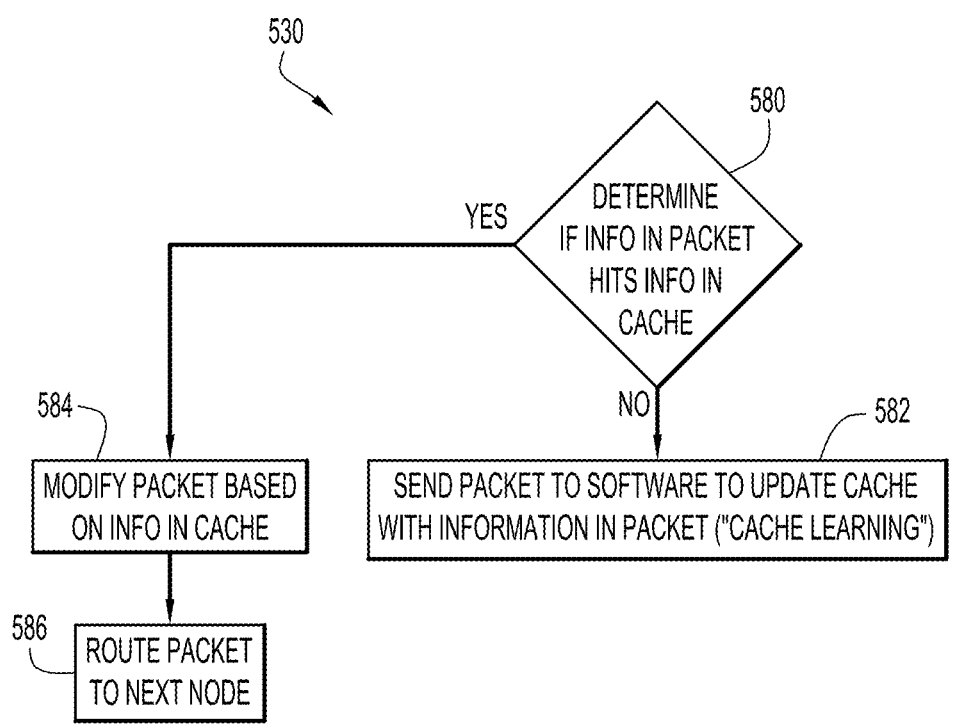
FIG. 5B is a flow diagram illustrating steps performed in one of the steps of the flow diagram of FIG. 5A, in accordance with the techniques presented herein.

FIG. 5B shows details of the packet caching performed in step 530 of FIG. 5A. In step 580, a packet received by node D2 (for routing to node D3) is checked against information in the cache to determine if there is a cache "hit." If there is not a cache hit at node D2 ("No" path output from step 580), then in step 582, node D2 sends the packet to software residing in node D2 (e.g., a CPU or processor), so that node D2 can learn the information in this packet and update its cache to include the IP source address and network tag information associated with the received packet. That way, when another packet is received at a later point in time by node D2 as sent by node D1, and whereby this other packet has the same IP source address as the earlier-received packet that resulted in an update of the cache, this other packet can be processed by node D2 to either strip the network tag off of the packet or change the network tag to a different network tag that node D3 accepts. If there is a cache hit at node D2 ("Yes" path output from step 580), then in step 584, node D2 does not update its cache, and in step 586 node D2 routes the packet to node D3.

In a similar manner, with reference also to FIG. 4, restoring node D4 updates its cache based on the information provided to it from modifying node D2 on path 410. That is, when a packet is received by node D4 from non-recognizing node D3, and in which the packet's IP source address results in a hit in the cache at node D4, then node D4 modifies the packet back to its original state based on the information in the cache. But when a packet is received by node D4 from node D3 in which there is no hit at the cache at node D4, then node D4 does not change the packet that it received from node D3, but rather sends it to downstream node D5.

FIG. 6 is a block diagram of an apparatus 600 for caching packets and modifying packets prior to sending those packets to another node. This figure may correspond to the elements of modifying and restoring node D2 of FIG. 1, and to elements of modifying node D2 and restoring node D4 of FIG. 4. Packet receiving module 610, e.g., a port, that receives a packet output from an upstream node in the network, in which the packet includes a network tag. Determining module 620 determines whether the packet is to be forwarded to a node in the network that is not capable of processing packets with network tags at a desired speed (or at all). Based on that determination made by the determining module 620, which includes referring to a cache 625 that stores tuples of IP source address and network tag, the packet is either sent directly to output module 630 for transmission to the other node for processing without being modified, or the packet is sent to a packet modification module 640 to modify the packet in some manner (e.g., strip network tag, change network tag from one protocol to another protocol, or encapsulate the packet), and then the modified packet is provided to output module 630 for transmission to the other node for processing.

Processed packets received by the apparatus 600 are received by processed packets receiving module 645 (e.g., another port) on a network path 650 that connects the apparatus 600, either directly or via other nodes, to the non-recognizing node, in which those packets are compared to information within the cache 625 to determine the appropriate type of restoration to be performed on those packets by a packet restoration module 660, prior to those packets being sent out to the output module 630 for routing to a downstream node on the network. In FIG. 6, the determining module 620 also updates the cache 625 with new tuples (and may also remove aged tuples) based on packets received by packet receiving module 610 that require processing by the non-recognizing node. In the "series" network configuration shown in FIG. 4, processed packet receiving module 645, packet restoration modification module 660, output module 630, and cache 625 may be provided in node D4; and packet receiving module 610, packet modification module 640, determining module 660, and output module 630 may be provided in node D2.

For the "series" network configuration shown in FIG. 4, the packet modification module 640 notifies a network node downstream of non-recognizing node D3 (see node D4 in FIG. 4) of the modification performed on the packet, so that the downstream network node can then restore the processed packet back to its original structure (e.g., put a stripped network tag back into the packet, or translate the network tag back from a modified network tag to its original network tag, or decapsulate the packet that was encapsulated by the first packet modification module 640). The connection of the first packet modification module 640 to the downstream node may be via a dedicated or a non-dedicated control protocol connection, such as connection 410 as shown in FIG. 4. As will be evident from the previous description, control path 410 may not be required in the case of encapsulation, since the encapsulating header provides an indication of the destination address of the restoring node.

In FIG. 6, the determining module 620, cache 625, output module 630, packet modification module 640, and packet restoration module 660 may be implemented by digital logic gates in one or more application specific integrated circuits (ASICs) of a network device, or as described below in connection with FIG. 7, as processor executable instructions stored in memory and executed by a processor. Thus, the operations of these modules may be executed by a processor unit so that in one form, an apparatus embodying the techniques presented herein comprises a port configured to receive a packet that includes a network tag and a processor unit coupled to the port and configured to perform the operations of the aforementioned modules.

Figure 7:
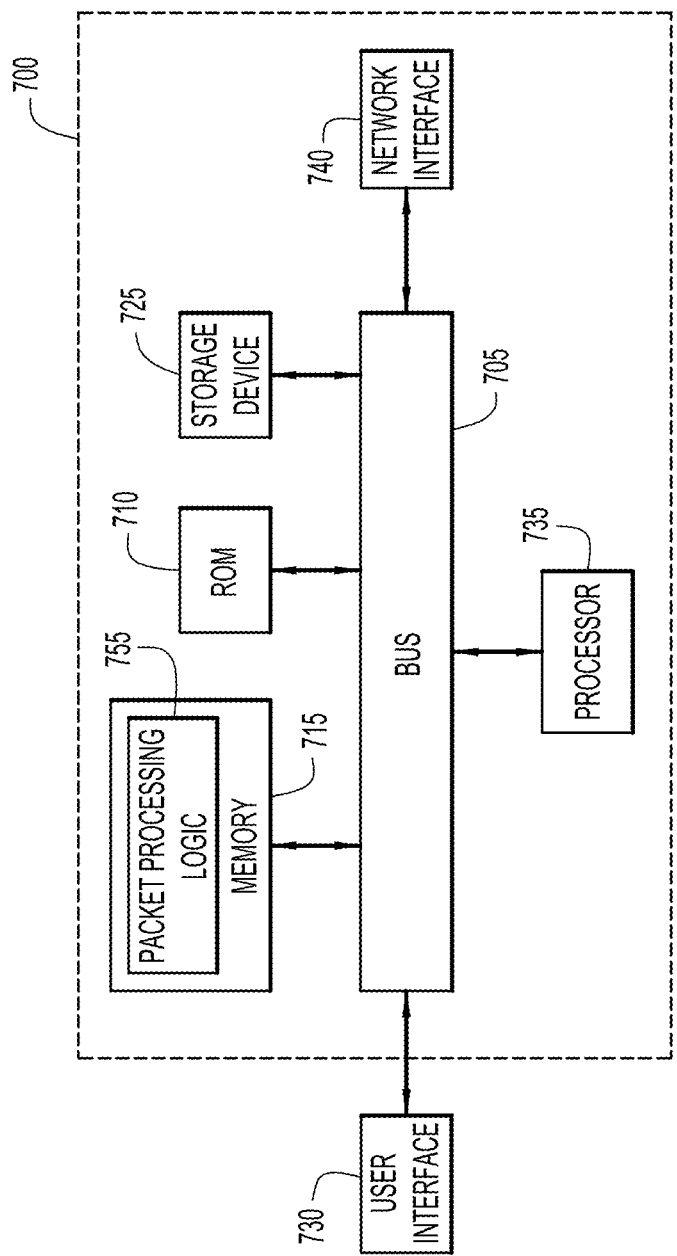
FIG. 7 is an example block diagram of a computer-implemented network component that may be used to analyze a packet in order to determine an appropriate modification to be performed on the packet, in accordance with the techniques presented herein.

FIG. 7 illustrates a depiction of a computing system 700 that can evaluate and modify (if necessary) packets with network tags that are destined to another node by using a caching scheme according to the techniques described above. The computing system 700 includes a bus 705 or other communication mechanism for communicating information and a processor 710 coupled to the bus 805 for processing information. Network interface 740 provides an interface to a network for receiving packet from the network and for outputting packets to the network. The computing system 700 also includes a memory 715, such as a random access memory (RAM) or other dynamic storage device, coupled to the bus 705 for storing information, and instructions to be executed by the processor 735. Memory 715 can also be used for storing temporary variables or other intermediate information during execution of instructions by the processor 735. The computing system 700 may further include a read only memory (ROM) 710 or other static storage device coupled to the bus 705 for storing static information and instructions for the processor 735. A storage device 725, such as a solid state device, magnetic disk or optical disk, is coupled to the bus 705 for persistently storing information and instructions.

The functions of processor 735 may be implemented by logic encoded in one or more tangible readable media (e.g., embedded logic such as an application specific integrated circuit, digital signal processor instructions, software that is executed by a processor, etc.), wherein memory 715 stores data used for the operations described herein and stores software or processor executable instructions that are executed to carry out the operations described herein.

Packet processing logic 755 is utilized by processor 735 to evaluate and modify packets to be sent to another node for processing and to evaluate and modify processed packets that are received from the other node as described above with respect to one or more implementations.

Packet processing logic 755 may take any of a variety of forms, so as to be encoded in one or more tangible computer readable memory media or storage device for execution, such as fixed logic or programmable logic (e.g., software/computer instructions executed by a processor) and the processor 735 may be an application specific integrated circuit (ASIC) that comprises fixed digital logic, or a combination thereof. For example, the processor 735 may be embodied by digital logic gates in a fixed or programmable digital logic integrated circuit, which digital logic gates are configured to perform the packet processing logic 755. In another form, the packet processing logic 755 may be embodied in one or more computer readable storage media encoded with software comprising computer executable instructions and when the software is executed operable to perform the operations described herein for the packet processing logic 755.

The computing system 700 may be coupled via the bus 705 to a user interface 830 that may include, for example, a display for displaying information to a user and one or more input devices such as a touch screen, keyboard or other input device.

According to various implementations of the techniques described herein, the processes that effectuate illustrative implementations that are described herein can be implemented by the computing system 700 in response to the processor 735 executing an arrangement of instructions contained in main memory 715. Such instructions can be read into memory 715 from another computer-readable medium, such as the storage device 725. Execution of the arrangement of instructions contained in memory 715 causes the computing system 700 to perform the illustrative processes described herein. One or more processors in a multi-processing arrangement may also be employed to execute the instructions contained in memory 715. In alternative implementations, hard-wired circuitry may be used in place of or in combination with software instructions to implement illustrative implementations. Thus, implementations are not limited to any specific combination of hardware circuitry and software.

Although example memory read and write systems are shown and described herein, implementations of the subject matter and the functional operations of the techniques described herein can be implemented in other types of digital electronic circuitry, or in computer software embodied in a tangible medium, firmware, or hardware, including the structures disclosed in this specification and their structural equivalents, or in combinations of one or more of them.

Implementations of the subject matter and the operations of the techniques described herein can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "node" or "network device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows of the techniques described herein can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Implementations of the subject matter of the techniques described herein can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products or a combination of software, firmware, and/or hardware including general purpose processors, FPGAs, and/or ASICs.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The above description is intended by way of example only.

What is claimed is:

1. A method comprising:
   receiving a packet that includes a network tag at a modifying node capable of modifying the packet in relation to the network tag;
   determining by the modifying node whether the packet is to be forwarded to a non-recognizing node in a network, the non-recognizing node not being capable of processing packets with network tags at a desired speed or at all;
   in response to determining that the packet is to be forwarded to the non-recognizing node, removing the network tag from the packet by the modifying node to obtain a modified packet and sending the modified packet to the non-recognizing node, wherein the modified packet is capable of being processed by the non-recognizing node at the desired speed;
   caching at the modifying node, in a network tag cache table, the network tag and a source address of the packet in association with the network tag;
   receiving the modified packet at a restoring node; and
   restoring the modified packet at the restoring node such that the network tag is available to the restoring node and downstream nodes, wherein restoring the modified packet comprises:
      matching the source address of the modified packet with a matching source address in the network tag cache table; and
      inserting into the modified packet the network tag associated with the matching source address in the network tag cache table.

2. The method of claim 1, wherein the restoring node is the modifying node.

3. A method comprising:
   receiving a packet that includes a network tag at a modifying node capable of modifying the packet in relation to the network tag;
   determining by the modifying node whether the packet is to be forwarded to a non-recognizing node in a network, the non-recognizing node not being capable of processing packets with network tags at a desired speed or at all;
   in response to determining that the packet is to be forwarded to the non-recognizing node, replacing the network tag with a replacement tag to obtain a modified packet and sending the modified packet to the non-recognizing node, wherein the modified packet is capable of being processed by the non-recognizing node at the desired speed;
   caching, at the modifying node, in a network tag cache table, the network tag in association with at least one of a source address of the packet and the replacement tag;
   receiving the modified packet at a restoring node; and
   restoring the modified packet at the restoring node such that the network tag is available to the restoring node and downstream nodes, wherein restoring the modified packet comprises:
      matching the source address of the modified packet with a matching source address in the network tag cache table or matching the replacement tag of the modified packet with a matching replacement tag in the network tag cache table; and
      replacing the replacement tag in the modified packet with the network tag associated with the matching source address or with the matching replacement tag in the network tag cache table.

4. The method of claim 3, wherein the network tag is a Service Insertion Architecture (SIA) or Security Group Tag (SGT) network tag, and wherein the replacement tag is an IEEE 802.1q network tag.

5. An apparatus comprising:
a first port configured to receive a packet that includes a network tag;
a processor unit coupled to the first port, wherein the processor is configured to:
determine whether the packet is to be forwarded to a non-recognizing apparatus in a network, the non-recognizing apparatus not being capable of processing packets with network tags at a desired speed or at all;
remove the network tag from the packet to obtain a modified packet in response to a determination that the packet is to be forwarded to the non-recognizing apparatus, wherein the modified packet is capable of being processed by the non-recognizing apparatus at the desired speed; and
output the modified packet to the non-recognizing apparatus;
a tag cache configured to cache a source address of the packet in association with the network tag in response to a determination that the packet is to be forwarded to the non-recognizing apparatus; and
a second port configured to receive the modified packet subsequent to the modified packet being processed by the non-recognizing node;
wherein the processor unit is further configured to restore the modified packet by matching the source address of the modified packet with a matching source address in the tag cache and inserting into the modified packet the network tag associated with the matching source address in the tag cache such that the network tag is available to downstream nodes in the network.

6. An apparatus comprising:
a first port configured to receive a packet that includes a network tag;
a processor unit coupled to the first port, wherein the processor is configured to:
determine whether the packet is to be forwarded to a non-recognizing apparatus in a network, the non-recognizing apparatus not being capable of processing packets with network tags at a desired speed or at all;
replace the network tag with a replacement tag to obtain a modified packet in response to a determination that the packet is to be forwarded to the non-recognizing apparatus, wherein the modified packet is capable of being processed by the non-recognizing apparatus at the desired speed; and
output the modified packet to the non-recognizing apparatus;
a tag cache configured to cache the network tag in association with at least one of a source address of the packet and the replacement tag, in response to a determination that the packet is to be forwarded to the non-recognizing apparatus; and
a second port configured to receive the modified packet subsequent to the modified packet being processed by the non-recognizing node;
wherein the processor unit is further configured to restore the packet by:
matching the source address of the modified packet with a matching source address in the tag cache or matching the replacement tag of the modified packet with a matching replacement tag in the tag cache; and
replacing the replacement tag in the modified packet with the network tag associated with the matching source address or with the matching replacement tag in the tag cache.

7. The apparatus of claim 6, wherein the network tag is a Service Insertion Architecture (SIA) or Security Group Tag (SGT) network tag, and wherein the replacement tag is an IEEE 802.1q network tag.

8. A computer readable non-transitory storage media encoded with instructions that, when executed by a processor, cause the processor to:
receive a packet that includes a network tag;
determine whether the packet is to be forwarded to a non-recognizing node in a network, the non-recognizing node not being capable of processing packets with network tags at a desired speed or at all;
in response to a determination that the packet is to be forwarded to the non-recognizing node, remove the network tag from the packet to obtain a modified packet and send the modified packet to the non-recognizing node, wherein the modified packet is capable of being processed by the non-recognizing node at the desired speed;
cache in a network tag cache table, the network tag and a source address of the packet in association with the network tag in response to determining that the packet is to be forwarded to the non-recognizing node;
receive the modified packet from the non-recognizing node; and
restore the modified packet such that the network tag is available to downstream nodes in the network, wherein the instructions to restore the modified packet comprise instructions to:
match the source address of the modified packet with a matching source address in the network tag cache table; and
insert into the modified packet the network tag associated with the matching source address in the network tag cache table.

9. A computer readable non-transitory storage media encoded with instructions that, when executed by a processor, cause the processor to:
receive a packet that includes a network tag;
determine whether the packet is to be forwarded to a non-recognizing node in a network, the non-recognizing node not being capable of processing packets with network tags at a desired speed or at all;
in response to a determination that the packet is to be forwarded to the non-recognizing node, replace the network tag with a replacement tag to obtain a modified packet and send the modified packet to the non-recognizing node, wherein the modified packet is capable of being processed by the non-recognizing node at the desired speed;
cache in a network tag cache table, the network tag in association with at least one of a source address of the packet and the replacement tag, in response to determining that the packet is to be forwarded to the non-recognizing node;
receive the modified packet from the non-recognizing node; and
restore the modified packet such that the network tag is available to downstream nodes in the network, wherein the instructions to restore the modified packet comprise instructions to:
match the source address of the modified packet with a matching source address in the network tag cache table or match the replacement tag of the modified packet with a matching replacement tag in the network tag cache table; and replace the replacement tag in the modified packet with the network tag associated with the matching source address or with the matching replacement tag in the network tag cache table.

10. The computer readable non-transitory storage media of claim 9, wherein the network tag is a Service Insertion Architecture (SIA) or Security Group Tag (SGT) network tag, and wherein the replacement tag is an IEEE 802.1q network tag.

11. The method of claim 1, wherein the network tag is a Service Insertion Architecture (SIA) or Security Group Tag (SGT) network tag.

12. The method of claim 3, wherein the restoring node is the modifying node.

13. The apparatus of claim 5, wherein the network tag is a Service Insertion Architecture (SIA) or Security Group Tag (SGT) network tag.

14. The computer readable non-transitory storage media of claim 8, wherein the network tag is a Service Insertion Architecture (SIA) or Security Group Tag (SGT) network tag.

* * * * *